June 19, 1934.  L. P. CULLNAN  1,963,833
WRENCH
Filed Jan. 26, 1932
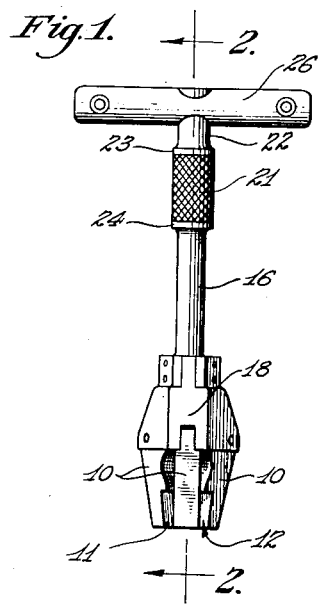
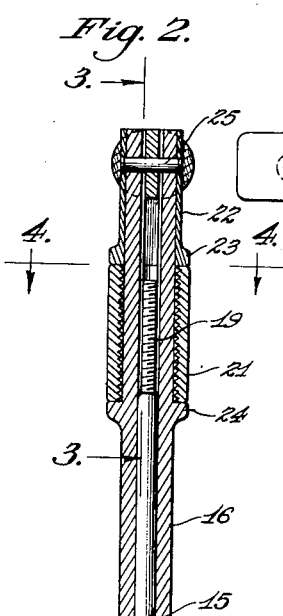
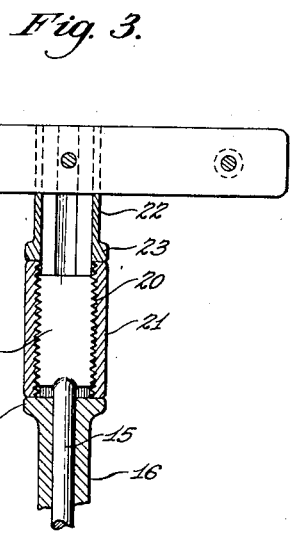
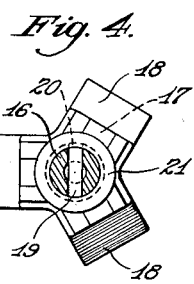
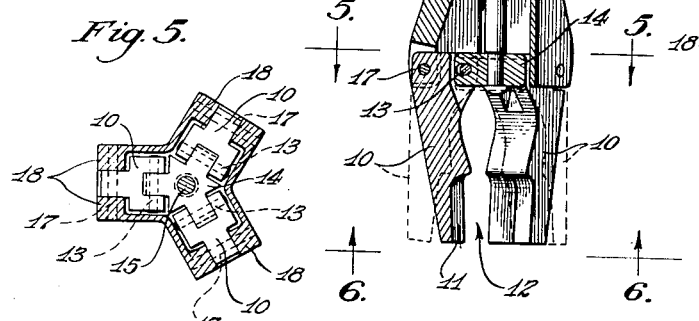
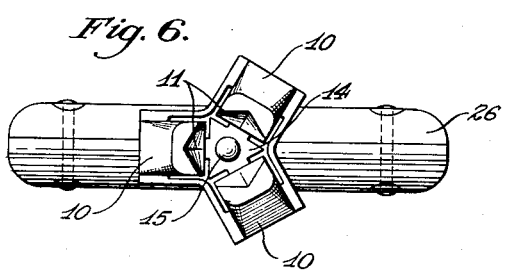
Lawrence P. Cullnan.
INVENTOR
BY Victor J. Evans & Co.
HIS ATTORNEYS Patented June 19, 1934

1,963,833

UNITED STATES PATENT OFFICE 1,963,833

WRENCH

Lawrence P. Cullnan, Chicago, Ill.

Application January 26, 1932, Serial No. 588,978

2 Claims. (Cl. 81—111)

This invention relates to certain novel improvements in wrenches, and has for its principal object the provision of an improved construction of this character which will be highly efficient in use and economical in manufacture.

Another object of the invention is to provide novel and improved means for adjusting the wrench to various sizes of nuts.

A further object of the invention is to provide novel, efficient, and improved means for operating the adjustable nut-clamping jaws embodied in the invention.

Other objects will appear hereinafter.

The invention consists in the novel combination and arrangement of parts to be hereinafter described and claimed.

The invention will be best understood by reference to the accompanying drawing, showing the preferred form of construction and in which:

Fig. 1 is an elevational view of a practical embodiment of the invention;

Fig. 2 is a longitudinal sectional view on line 2—2 in Fig. 1;

Fig. 3 is a fragmentary sectional view on line 3—3 in Fig. 2;

Fig. 4 is a sectional view on line 4—4 in Fig. 2;

Fig. 5 is a sectional view on line 5—5 in Fig. 2; and

Fig. 6 is a bottom plan view on line 6—6 in Fig. 2.

In the drawing, which illustrates a preferred and practical embodiment of the invention, spreadable, nut-clamping jaws are indicated at 10. Each of these jaws is provided with a recess 11 and the jaws 10 and their recesses 11 collectively provide a socket 12 for the reception of a nut. Each of the jaws 10 is pivotally connected, as at 13, to the head 14 of the stem member 15 which is movable relatively to a sleeve 16 arranged thereon; and each of the jaws 10 is pivotally connected, at 17, to a portion 18 of the sleeve 16.

The stem member 15 has an externally threaded relatively flat portion 19 which has threaded engagement with the internal threads 20 of a rotative member or collar 21 which provides a finger grip rotatable about the sleeve 16. A retaining member 22 is arranged about the sleeve 16 and this member 22 has a flange 23 which cooperates with a flange 24 on the sleeve 16 to retain the rotative member 21 in fixed position relation to the axis of the stem member 15. Attached to the sleeve 16 and to the retaining member 22, as at 25, is a hand grip 26.

By reason of the flanges 23 and 24 the rotative member 21 is retained relatively fixed with respect to the axes of the sleeve 16 and of the stem member 15 so that by rotating the member 21, the internal threads 20 of which are engaged with the threads of the flat portion 19 of stem member 15, the stem member 15 is moved relative to sleeve 16; the flat portion 19 of the stem member 15 being unable to rotate within the sleeve 16. This movement of the stem member 15, relative to sleeve 16, likewise moves the head 14 on the stem member 15 so that when the stem member 15 and its head 14 are moved, downwardly as seen in Fig. 2, the jaws 10 are rotated away from each other, about their pivots 17, and are thus spread apart to enlarge the socket 12. By rotating the member 21 in the opposite direction the stem member 15 and its head 14 are moved, relative to sleeve 16, upwardly, as seen in Fig. 2, and the jaws are rotated toward each other about their pivots 17 to clamp the jaws into engagement with a nut received in the socket 12.

While I have illustrated and described the preferred form of construction for carrying my invention into effect, this is capable of variation and modification, without departing from the spirit of the invention. I, therefore, do not wish to be limited to the precise details of construction set forth, but desire to avail myself of such variations and modifications as come within the scope of the appended claims.

Having thus described my invention what I claim as new and desire to protect by Letters Patent is:

1. A wrench comprising a tubular member having a hollow head at one end and a pair of diametrically opposed slots through its wall near the opposite end, a shaft slidably mounted within said tubular member and having threaded portions extending through said slots, a threaded member rotatably mounted upon said tubular member and engaging the threads of said portions, to move the shaft longitudinally of the tubular member when rotated about the latter, abutments engaging the ends of said threaded member for holding the same against movement longitudinally of the tubular member, said head being slotted, a connecting member carried by said shaft and positioned within said head, a plurality of jaws positioned within said slots and pivotally connected with the head, and means for loosely connecting the jaws with said connecting member.

2. A wrench comprising a tubular member having a hollow head at one end and a pair of diametrically opposed slots through its wall near the opposite end, a shaft slidably positioned within said tubular member and having threaded portions extending through said slots, a threaded member rotatably mounted upon said tubular member and engaging the threads of said portions, to move the shaft longitudinally of the tubular member when rotated about the latter, abutments arranged to limit movement of the threaded member longitudinally of the tubular member, said head being provided with a plurality of slots, jaws having portions fitting snugly within said slots and pivotally connected with the head, a connecting element carried by said shaft and positioned within said head, said jaws being provided with forked portions fitting snugly within said head, said connecting element having projections fitting snugly within said forked portions, and means loosely connecting said extensions with said forked portions.

LAWRENCE P. CULLNAN.